United States Patent
Ortmann

(10) Patent No.: US 7,517,298 B2
(45) Date of Patent: Apr. 14, 2009

(54) POWER-ON DOWNSHIFT CONTROL FOR A HYBRID ELECTRIC VEHICLE POWERTRAIN

(75) Inventor: Walter Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 11/469,988

(22) Filed: Sep. 5, 2006

(65) Prior Publication Data
US 2008/0058152 A1    Mar. 6, 2008

(51) Int. Cl.
*B60K 1/02*    (2006.01)
(52) U.S. Cl. .............................. 477/3; 477/15
(58) Field of Classification Search .............. 477/2, 477/3, 7, 15
See application file for complete search history.

(56) References Cited
U.S. PATENT DOCUMENTS

| | | | |
|---|---|---|---|
| 5,713,425 A | 2/1998 | Buschhaus et al. | |
| 6,116,363 A | 9/2000 | Frank | |
| 6,203,468 B1 * | 3/2001 | Nitta et al. | 477/5 |
| 6,319,168 B1 | 11/2001 | Morris et al. | |
| 6,321,143 B1 | 11/2001 | Phillips et al. | |
| 6,524,216 B2 | 2/2003 | Suzuki et al. | |
| 6,857,985 B2 | 2/2005 | Williams | |
| 7,373,933 B2 * | 5/2008 | Kamada et al. | 123/568.21 |
| 7,383,115 B2 * | 6/2008 | Tabata et al. | 701/96 |
| 7,434,641 B2 * | 10/2008 | Takami et al. | 180/65.4 |
| 7,458,650 B2 * | 12/2008 | Toyota et al. | 303/151 |
| 2005/0032598 A1 | 2/2005 | Hanyu et al. | |
| 2005/0054480 A1 | 3/2005 | Ortmann et al. | |

* cited by examiner

*Primary Examiner*—Ha D. Ho
(74) *Attorney, Agent, or Firm*—David B. Kelley; Brooks Kushman P.C.

(57) ABSTRACT

A method for controlling a hybrid electric vehicle powertrain having an engine, a multiple-ratio transmission, a first electric machine and a second electric machine. On a power-on transmission downshift, electric wheel torque is used to compensate for a slow response of an engine to a request for increased traction wheel torque.

12 Claims, 3 Drawing Sheets

POWER-ON DOWNSHIFT CONTROL

POWER-ON DOWNSHIFT CONTROL FOR A HYBRID ELECTRIC VEHICLE POWERTRAIN

BACKGROUND OF THE INVENTION

1. Field of the Invention

The invention relates to a hybrid electric vehicle powertrain with a multiple-ratio transmission for delivering driving power to vehicle traction wheels.

2. Background Art

Hybrid electric vehicle powertrains for automotive vehicles typically include an internal combustion engine and an electric motor-generator, which define mechanical and electrical driving power sources. One class of hybrid electric vehicle powertrains includes an engine and a motor-generator with gearing in a split power arrangement in which power delivery from each power source to vehicle traction wheels is coordinated to meet a driver demand for power. Such a powertrain arrangement is disclosed in U.S. Pat. No. 6,991,053, which is assigned to the assignee of the present invention. Another class of hybrid electric vehicle powertrains is a so-called dual-drive hybrid electric vehicle powertrain in which an internal combustion engine and a multiple-ratio automatic transmission are situated on a common axis and a crankshaft integrated starter-generator is disposed between the engine and a torque input shaft for the transmission. An example of a powertrain of this type is disclosed in U.S. patent application Ser. No. 11/467,588, filed Aug. 28, 2006, entitled "Strategy for Improving Shift Quality in a Hybrid Electric Vehicle Powertrain," which is assigned to the assignee of the present invention. An example of a dual-drive hybrid electric vehicle powertrain with a disconnect clutch between the engine and an electric motor is disclosed in U.S. Pat. No. 6,116,363.

Still another example of a hybrid electric vehicle powertrain having a multiple-ratio automatic transmission, an electric traction motor and an internal combustion engine defining dual power flow paths to vehicle traction wheels is disclosed in U.S. patent publication 2005/0054480, filed Sep. 10, 2004, which also is assigned to the assignee of the present invention.

A hybrid electric vehicle powertrain having a standard manually-controlled transmission with a conventional neutral clutch in a powertrain that includes an engine and an electric motor is disclosed in U.S. Pat. No. 6,319,168.

The dual-drive powertrains disclosed in the latter two of these prior references have controlled ratio upshifts as the powertrain accelerates the vehicle. Electric motor torque and engine torque under the control of a vehicle system controller develop traction wheel torque in an upshift interval.

The patent publication, identified above, discloses a hybrid electric powertrain with a multiple ratio transmission having a hydrokinetic torque converter and multiple-ratio gearing in the torque flow path from the engine to the traction wheels. That powertrain includes a slipping wet clutch to connect a crankshaft of the internal combustion engine to the torque input shaft of the transmission. The engagement characteristics of the wet clutch can be used to attenuate inertia torque fluctuations during a transmission upshift or a coasting downshift.

In the case of power-on downshifts of known hybrid electric vehicle powertrains, the vehicle driver typically depresses an accelerator pedal to request torque to accelerate the vehicle. A transmission controller will respond to a driver request for torque by downshifting the transmission, which causes the engine torque to increase because of the increased throttle setting that accompanies depression of the accelerator pedal. The first increment of the engine torque increase is used to overcome the engine inertia torque and to bring the engine speed up to the higher level required with an increased transmission gear ratio.

During a downshift, the transmission will remain in the upshifted torque ratio until the end of the speed ratio change. During the progression of the speed ratio change, there is no increase in wheel torque since the increase in engine torque is used to overcome inertia forces. This condition causes a delay in the desired acceleration increase. The length of this delay depends on the amount of torque that the engine is producing for a given amount of effective inertia of the rotating elements of the engine and the powertrain. Typically, this delay time may be close to one second.

SUMMARY OF THE INVENTION

One embodiment of the invention can be applied to a so-called dual drive hybrid electric vehicle powertrain of the kind previously described in the preceding background art discussion. Such a powertrain has essentially two torque delivery paths. One torque delivery path extends from the engine through mechanical torque delivery elements to the traction wheels. A crank integrated starter-generator is located at the engine output shaft. The other torque delivery path extends from an electric motor to front traction wheels. The motor is electrically coupled to the engine to the crankshaft integrated starter-generator and a battery. The battery maintains reserve power that enables the motor to propel the vehicle using front traction wheels. This battery power is available with little delay in comparison to a delay in development of engine torque in response to a driver demand for acceleration.

By adding driving torque at the front traction wheels at the time of a power-on transmission downshift request, the quality of the downshift is improved. This improvement in quality results from an increased level of acceleration that can be provided immediately by adding motor torque to the front traction wheels. There is an immediate response to the driver's demand for acceleration.

Another feature of the invention is a shortened power-on downshift time that is made possible. This is due to the fact that a power-on downshift normally is calibrated to maintain driveline torque at a pre-shift torque level so that the driver does not experience a decrease in traction wheel torque during progression of the downshift. This normally is accomplished by holding a portion of the capacity of an off-going clutch element in the automatic transmission. This holding torque will slow down the shift by absorbing some of the engine torque that could be used to accelerate the engine. In a powertrain that embodies the present invention, however, the electric motor that drives the front traction wheels can be used to hold total driveline torque such that the rear axle torque can be lowered to permit the shift to occur faster.

The strategy of the present invention will provide an increased and uniform torque delivery to the traction wheels during a power-on downshift while at the same time reducing shift time.

The strategy of the present invention is especially effective during power-on downshifts at low vehicle speeds since inertia torque due to changes in speed of rotary powertrain components is lower when the vehicle speed is lower.

The increased level of acceleration following a driver request for acceleration is achieved by increasing torque output of an electric machine in the electrical power flow path in a first operating mode at the beginning of a power-on downshift, maintaining torque delivered through the transmission at its pre-shift level while a friction element in the transmission is slipping during a second operating mode as torque output of the electric machine remains unchanged, decreasing torque output of the second electric machine in a third operating mode at the end of the power-on downshift, and increasing torque delivered through the mechanical torque delivery elements at the end of the power-on downshift. This provides a fast response to a request for increased traction torque.

The decrease in power-on downshift time is achieved by maintaining torque output of an electric machine in an electrical power source and maintaining torque delivered through a mechanical power flow path at an unchanged level in a first operating mode of a power-on downshift, decreasing torque delivered through the mechanical driving power flow path during a second operating mode of a power-on downshift while a friction element in the mechanical power flow path is slipping, increasing torque output of the electric machine during the second operating mode, decreasing the torque output of the electric machine in the third operating mode and increasing torque in the mechanical torque flow path during a third operating mode as the friction element becomes fully engaged.

PARTICULAR DESCRIPTION OF AN
EMBODIMENT OF THE INVENTION

Figure 1:
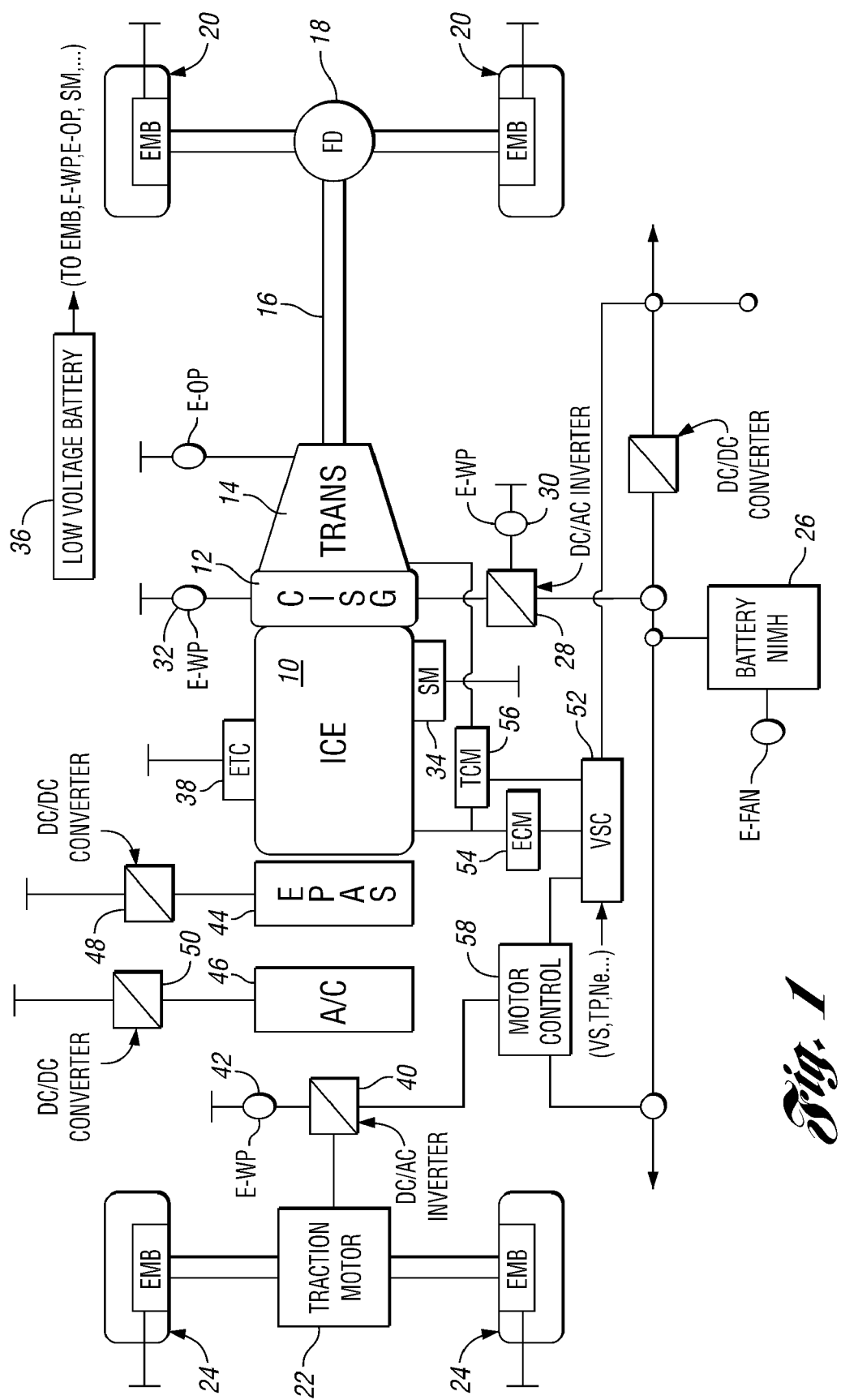
FIG. 1 is a schematic representation of a so-called dual drive, hybrid electric vehicle powertrain capable of embodying the strategy of the present invention.

In the powertrain illustrated in FIG. 1, an internal combustion engine (ICE) is shown at 10. The rotor of a crankshaft-integrated starter-generator (CISG), as shown at 12, is situated between the engine 10 and a multiple-ratio automatic transmission 14. The torque output end of the transmission 14 is connected through a driveline, including driveshaft 16, to a final drive differential-and-axle assembly 18 for delivering torque to traction wheels 20. Unlike the powertrain illustrated in the '066 patent, where a clutch is used to connect the engine crankshaft to the rotor of an electric machine, the rotor of the generator 12 is connected directly to the crankshaft of the engine 10 and to the torque input shaft of the transmission 14.

A traction motor, which may function as a generator to develop regenerative torque during a vehicle coast mode, is shown at 22. It includes a rotor drivably connected through front axle shafts to front traction wheels 24. Each of the traction wheels 20 and 24 may include an electromagnetic brake (EMB), as shown in FIG. 1. The generator 12 and the motor 22 are electrically coupled to a high voltage battery 26, which may be a nickle metal hydride battery. A first DC/AC inverter 28 is in the electrical connection between battery 26 and the generator 12 for converting DC electrical energy to AC electrical energy. Electric motor-powered water pumps 32 for cooling the high voltage circuit for the battery 26 and generator 12 are shown at 30 and 32. The starter motor (SM) shown at 34 may be used to start the engine if the high voltage system is shut down or if additional starting torque is required due to cool engine operating temperatures, for example. The starter motor 32 is powered by a low voltage battery 36. An electronic engine throttle control 38 and the water pumps 30 and 32 also are powered by the battery 36.

The high voltage battery 26 is electrically coupled to the traction motor 22 by a second DC/AC inverter 40. A water pump 42, which also is powered by the battery 36, provides coolant to the traction motor 22 and to the inverter 40.

An electronic power assist steering mechanism (EPAS) and an air conditioning system (AC), including a low voltage motor for driving a compressor, are shown at 44 and 46, respectively. The low voltage battery 36 powers the electromagnetic brakes (EMB)for the traction wheels, as well as DG/DC converters 48 and 50 for the power steering system 44 and the air conditioning system 46.

The powertrain includes a vehicle system controller 52, which coordinates control functions of an engine control module 54 and a transmission control module 56. The vehicle system controller responds to input variables, such as vehicle speed, throttle position, engine speed, engine coolant temperature, etc.

Shown at 58 is a motor control module for controlling the front, traction wheel-mounted, traction motor 22. It is electrically coupled to the DC/AC inverter 40, as shown.

Figure 1A:
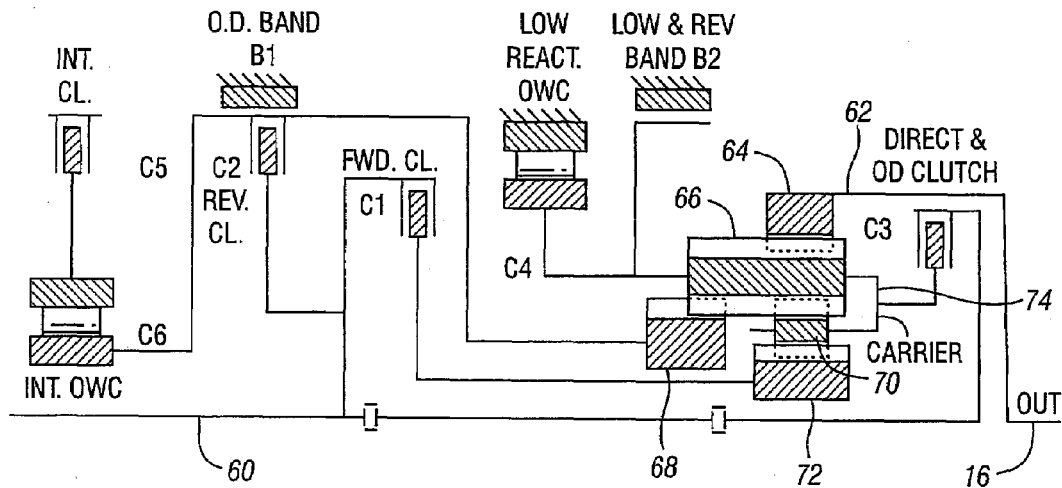
FIG. 1a is a schematic representation of the gearing elements and the clutches and brakes for a known multiple-ratio automatic transmission that can be used in the powertrain of FIG. 1.

A schematic representation of a multiple-ratio automatic transmission corresponding to the transmission 14 of FIG. 1 is illustrated in FIG. 1a. A power input shaft, which is drivably connected to the crankshaft of the internal combustion engine 10, is shown at 60. The driving connection can include a hydrokinetic torque converter or a friction clutch. A compound planetary gear unit 62 includes a ring gear 64 connected to driveshaft 16. A set of long planet pinions 66 drivably engages ring gear 64 and large sun gear 68, as well as short planet pinions 70. Small sun gear 72 engages short planet pinions 70. Long planet pinions 66 and short planet pinions 70 are journalled on a common carrier 74.

Carrier 74 is braked by a low-and-reverse brake band B2. A low ratio reaction overrunning coupling OWC complements brake band B2 to establish a reaction torque for the carrier during acceleration. Brake band B2 accommodates reaction torque during reverse drive as well as during engine braking when the transmission is in a low speed ratio.

During forward drive, torque is delivered from shaft 60 through forward clutch C1 to small sun gear 72. To establish the low forward-driving speed ratio, clutch C1 and brake band B2 are simultaneously applied. Torque then is delivered to small sun gear 72, which drives ring gear 64 at a low speed ratio.

A ratio shift from the low speed ratio to an intermediate speed ratio is achieved by braking large sun gear 68 and applying intermediate clutch C5. This clutch C5 will anchor the outer race of overrunning coupling C6, which holds the sun gear 68 stationary.

A third forward drive speed ratio is achieved by engaging clutch C3 simultaneously with engagement of clutch C1. Clutch C3 drivably connects shaft 60 to carrier 74. Since sun gear 72 is connected to shaft 60 at this time through clutch C1, the planetary gear unit is locked-up with a one-to-one ratio.

An overdrive ratio is achieved by engaging clutch C3, releasing clutch C1 and applying brake B1. Sun gear 68 then is anchored and the ring gear 64 is over-driven with respect to shaft 60.

Low reaction coupling OWC (sometimes called a brake) provides torque reaction for the carrier 74 during low speed ratio operation. In a low driving range, brake band B2 provides torque reaction for the carrier if coast braking in the second ratio is desired or if the transmission is in reverse drive.

During a typical power-on downshift, it is necessary to release a clutch and to apply a brake. For example, on a power-on downshift from the third ratio to the second ratio, clutch C3 is released and clutch C5, sometimes called a brake, is applied. The addition of traction motor torque at the front traction wheels will improve the quality of the power-on downshift since the response of the electric motor 22 to a driver demand for a higher level of acceleration is provided immediately.

Figure 2:
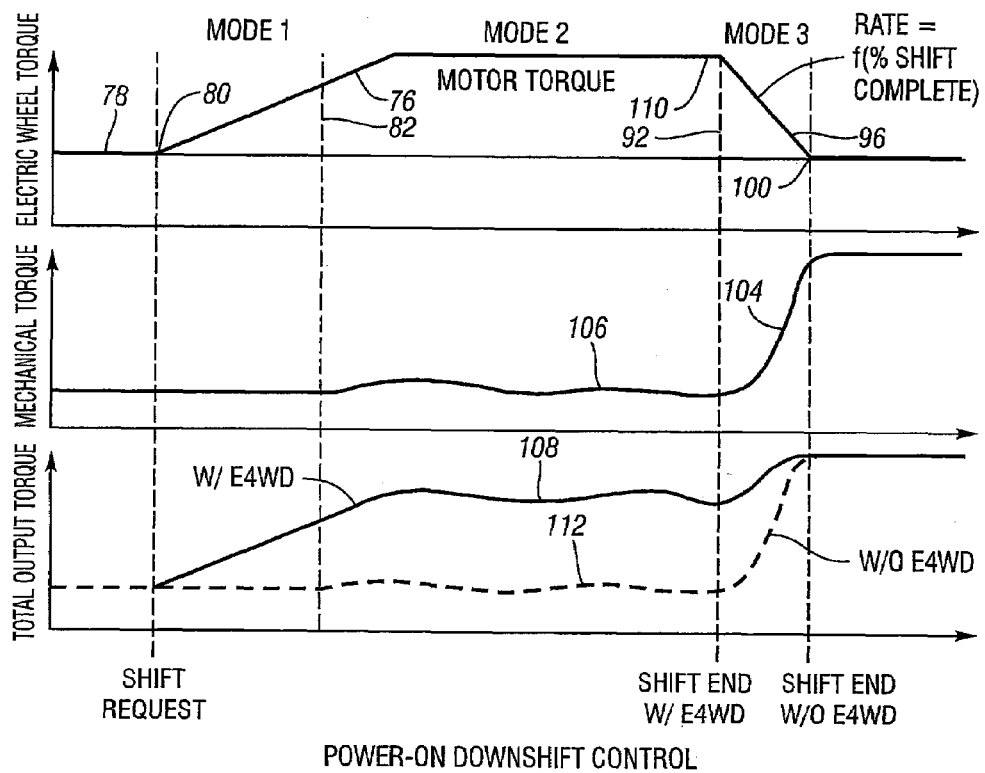
FIG. 2 is a time plot of electric wheel torque, mechanical torque and total output torque during progression of a power-on downshift.

This response of the motor is unlike the response of the engine to a demand for acceleration torque because of the greater inertia of the rotary elements in the mechanical power flow path for the engine. This feature is illustrated in FIG. 2 where motor torque versus downshift time is plotted at 76. The traction motor torque initially is at a level shown at 78 prior to the downshift. The increase in electric motor torque at the front traction wheels is referred to as mode 1. This can be called the "fill phase". The term "fill phase" refers to the period in which fluid under pressure is distributed to a fluid pressure actuator for a friction element for a clutch or brake. Mode 1 begins as soon as a power-on downshift is requested at 80. Mode 1 continues until point 82 is reached on the time scale. The increase in motor torque will continue beyond the termination of mode 1. If it is desired to only reduce shift time rather than to provide immediate increased wheel torque, the motor torque remains at its pre-shift level, as indicated at 84 in FIG. 3.

During mode 1 as seen in FIG. 2, the oncoming clutch, which is clutch C5 in the case of a 3-2 downshift, is commanded to be applied in order to fill the clutch, while the off-going clutch pressure on clutch C3 is lowered. The lowering of the pressure at off-going clutch C3 to below its capacity will allow the clutch to slip and to begin to effect a change in ratios.

Figure 3:
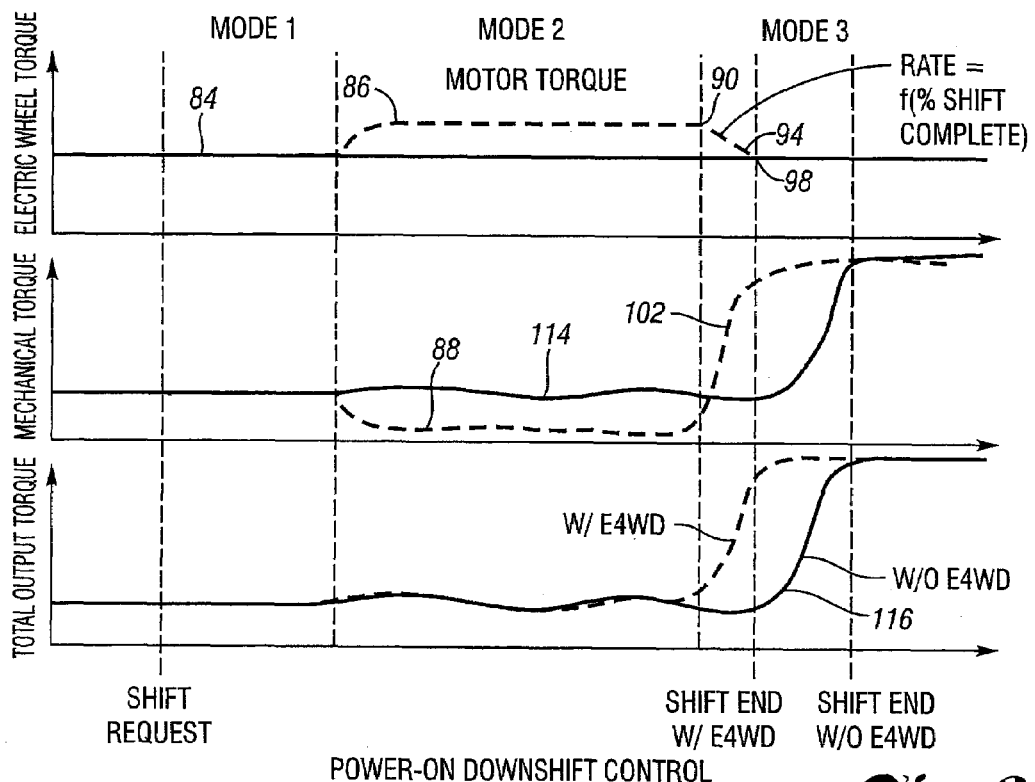
FIG. 3 is a time plot of electric wheel torque, mechanical torque and total output torque, which demonstrates that total output torque can be maintained at a relatively uniform level during a power-on downshift and that a mechanical torque decrease can be balanced by an increase in electric wheel torque during a power-on downshift.

The controller will monitor the input speed and the output speed and calculate a percent of shift completion during the shift interval. Speed sensors, not shown, provide the speed data. When the value for the percent shift completion reaches a predetermined value, a transition will be made in the control strategy to mode 2, as indicated in FIGS. 2 and 3. Like FIG. 2, FIG. 3 is a plot of electric wheel torque, mechanical torque and total output torque versus downshift time. This is the part of the shift interval where the speed ratio change occurs. This may be called the ratio change phase. As seen in FIG. 2, the motor torque maintains its trajectory that initially was established in mode 1 if the strategy is intended to boost traction wheel torque quickly.

If it is the objective to merely reduce shift time rather than to quickly boost wheel torque, the motor torque is increased after a transition is made from mode 1 to mode 2, as shown at 86 in FIG. 3, so that it will be approximately equal and opposite to a reduction in mechanical torque, as shown at 88 in FIG. 3. In mode 2 of FIG. 3, motor torque is increased to a level that is higher than the pre-shift level. Simultaneously, an approximately equal and opposite decrease in mechanical torque occurs because of the engine inertia characteristics discussed earlier.

The off-going clutch pressure is commanded using a conventional closed-loop controller, such as a proportional-integral-differential (PID) controller. The oncoming clutch pressure is commanded to hold near the clutch stroke pressure. When the percent of shift completion reaches a predetermined value, as shown at time value 90 in FIG. 3 and at 92 in FIG. 2, the strategy will move to mode 3.

In mode 3, the motor torque is ramped downward, as shown at 94 in FIG. 3 and at 96 in FIG. 2. The rate that the motor is brought back to its original value is a function of the percent shift completion. This ensures that the motor torque is synchronized with the completion of the shift. The oncoming pressure is commanded to its final value at a predetermined rate as the off-going clutch pressure is lowered to zero at time value 98 in FIG. 3 and at 100 in FIG. 2.

As motor torque is decreased in mode 3, the mechanical torque from the engine is increased, as shown at 102 in FIG. 3 and at 104 in FIG. 2. FIGS. 2 and 3 demonstrate the delay in a response of the engine to a demand for increased acceleration. The mechanical torque indicated at 106 in FIG. 2 remains relatively unchanged from its pre-shift level until mode 3 is entered. The total output torque indicated in FIG. 2 at 108, is higher than the initial output torque, but that is due only to the increase in motor torque, as shown at 110 in FIG. 2.

For purposes of comparison, the total output torque during a power-on downshift that does not include the strategy of the invention is plotted at 112 in FIG. 2. Further, the total mechanical torque for a powertrain that does not include the strategy of the invention is plotted in FIG. 3, as shown at 114. The total output torque for a powertrain that does not include the strategy of the invention is plotted in mode 3, as shown at 116.

Figure 4:
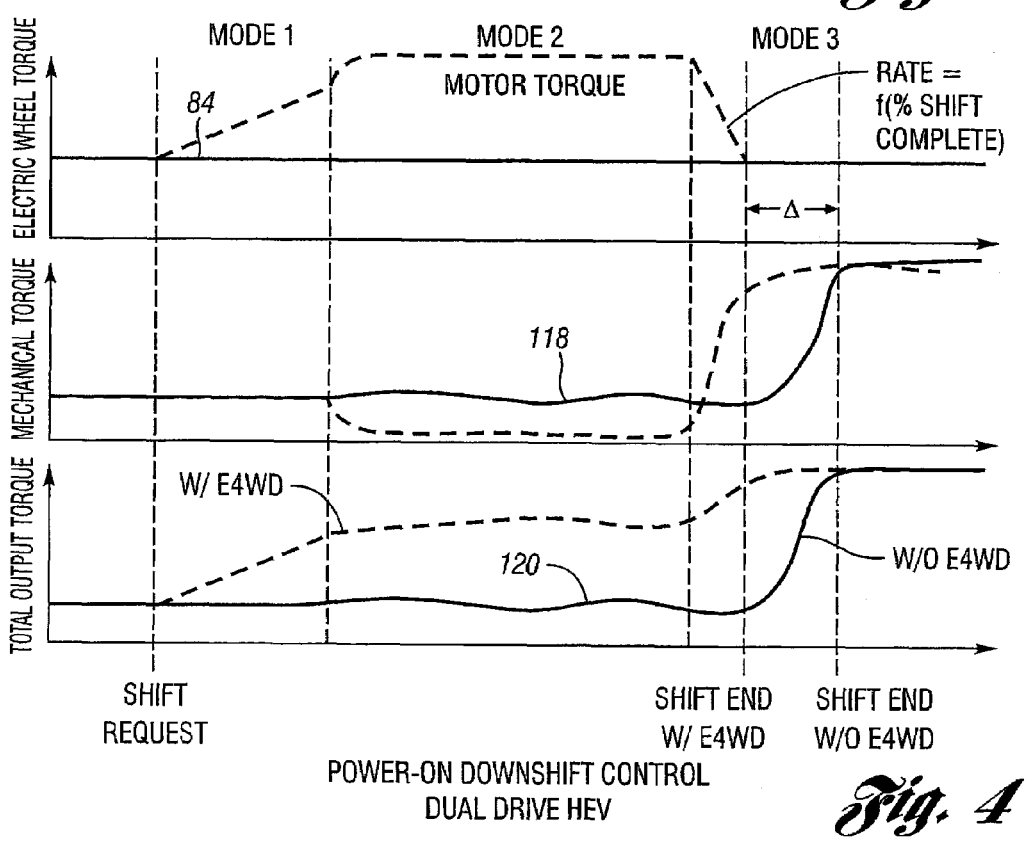
FIG. 4 is a composite representation of the characteristics illustrated in both FIG. 2 and FIG. 3, whereby the time of the shift is shortened and a request for acceleration is met sooner.

FIG. 4 is a time plot that is a combination of the characteristics shown in FIGS. 2 and 3. A plot of mechanical torque for a powertrain that does not include the strategy of the invention is indicated at 118 in FIG. 4. The corresponding plot for total output torque is indicated in FIG. 4 at 120. The value A, indicated in FIG. 4, is an indicator of the shortened downshift time that is available using the strategy of the invention.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for controlling power distribution in a hybrid electric vehicle powertrain, the powertrain comprising an engine, a multiple-ratio transmission having a power delivery member drivably connected to the engine for developing a mechanical driving power flow path to vehicle traction wheels, a first electric machine coupled to the engine and a second electric machine in an electrical power flow path to the vehicle traction wheels, the transmission having selectively engageable friction elements for establishing at least two forward drive transmission ratios, one friction element being released as a second friction element is engaged to effect a power-on downshift, the method comprising:

increasing torque output of the second electric machine in a first operating mode at the beginning of the power-on downshift following a shift request;

maintaining torque delivered through the mechanical driving power flow path at approximately its pre-shift level as the first friction element is slipping and the second friction element is engaging in a second operating mode;

maintaining torque output of the second electric machine during the second operating mode;

decreasing the torque output of the second electric machine in a third operating mode at the end of the power-on downshift; and increasing torque delivered through the mechanical power flow path to fully engage the second friction element in the third operating mode as the torque output of the second electric machine returns to approximately its pre-shift level whereby a fast response to a request for an increase in traction wheel torque is achieved.

2. The method set forth in claim 1 wherein the step of increasing torque output of the second electric machine in the first operating mode comprises increasing the torque output in the first operating mode at a predetermined rate, the increase in torque output being continued in the second operating mode for a predetermined time after the end of the first operating mode.

3. The method set forth in claim 1 wherein the decrease in the torque output of the second electric machine in the third operating mode occurs at a rate that is a function of a percentage of shift completion.

4. The method set forth in claim 2 wherein the decrease in the torque output of the second electric machine in the third operating mode occurs at a rate that is a function of a percentage of shift completion.

5. The method set forth in claim 1 wherein the first electric machine delivers torque through the transmission to a first set of traction wheels and the second electric machine delivers torque to a second set of traction wheels;
   the step of increasing torque output of the second electric machine resulting in an increase in torque at the second set of traction wheels; and
   the step of maintaining torque delivered through the mechanical power flow path and the step of maintaining torque output of the second electric machine resulting in an increase in total traction wheel torque during the second operating mode.

6. The method set forth in claim 5 where the decrease in the torque output of the second electric machine in the third operating mode occurs at a rate that is a function of a percentage of shift completion.

7. A method for controlling power distribution in a hybrid electric vehicle powertrain, the powertrain comprising an engine, a multiple-ratio transmission having a power delivery member drivably connected to the engine for developing a mechanical driving power flow path to vehicle traction wheels, a first electric machine coupled to the engine and a second electric machine in an electrical power flow path to the vehicle traction wheels, the transmission having selectively engageable friction elements for establishing at least two forward drive transmission ratios, one friction element being released as a second friction element is engaged to effect a power-on downshift, the method comprising:
   maintaining torque output of the second electric machine and maintaining torque delivered through the mechanical driving power flow path at appropriately their respective pre-shift levels in a first operating mode of the power-on downshift following a shift request;
   decreasing torque delivered through the mechanical driving power flow path to a value less than its pre-shift level to effect slipping of the first friction element during a second operating mode of the power-on downshift;
   increasing torque output of the second electric machine during the second operating mode to a level greater than its pre-shift level during the second operating mode;
   decreasing the torque output of the second electric machine during a third operating mode of the power-on downshift to a level approximately the same as the its pre-shift level; and
   increasing torque delivered through the mechanical power flow path during the third operating mode as the second friction element becomes fully engaged whereby the duration of the power-on downshift is shortened.

8. The method set forth in claim 7 wherein the first electric machine delivers power through the transmission to a first set of traction wheels and the second electric machine delivers torque to a second set of traction wheels;
   the step of increasing torque output of the second electric machine and the step of decreasing the torque delivered through the mechanical driving power flow path resulting in a total torque level at the traction wheels in the second operating mode that is approximately the same as the total torque level at the traction wheels in the first operating mode.

9. The method set forth in claim 7 wherein the decrease in the torque output of the second electric machine in the third operating mode occurs at a rate that is a function of a percentage of shift completion.

10. The method set forth in claim 7 wherein the step of decreasing torque delivered through the mechanical driving power flow path together with the step of increasing torque output of the second electric machine during the second operating mode of the power-on downshift effects a total traction wheel torque in the second operating mode that is approximately the same as a total traction wheel torque in the first operating operating mode.

11. A method for controlling power distribution in a hybrid electric vehicle powertrain, the powertrain comprising an engine, a multiple-ratio transmission having a power delivery member drivably connected to the engine for developing a mechanical driving power flow path to vehicle traction wheels, a first electric machine coupled to the engine and a second electric machine in an electrical power flow path to the vehicle traction wheels, the transmission having selectively engageable friction elements for establishing at least two forward drive transmission ratios, one friction element being released as a second friction element is engaged to effect a power-on downshift, the method comprising:
   increasing torque output of the second electric machine to a first level in a first operating mode at the beginning of the power-on downshift following a shift request;
   increasing torque output of the second electric machine to a higher second level in a second operating mode;
   maintaining torque delivered through the mechanical driving power flow path at approximately its pre-shift level in the first operating mode;
   decreasing torque delivered through the mechanical power flow path during the second operating mode to a level approximately equal to a difference between the first and second levels of torque for the second electric machine;
   decreasing the torque output of the second electric machine during a third operating mode at the end of the power-on downshift; and
   increasing torque delivered through the mechanical power flow path during the third operating mode as the second friction element becomes fully engaged whereby the downshift is shortened and traction wheel torque remains approximately unchanged at an increased level during the second operating mode.

12. The method of set forth in claim 11 wherein the decrease in the torque output of the second electric machine in the third operating mode occurs at a rate that is a function of a percentage of shift completion.

* * * * *